(12) United States Patent
Opitz et al.

(10) Patent No.: US 7,861,586 B2
(45) Date of Patent: Jan. 4, 2011

(54) HOT-FILM AIR MASS METER HAVING FREQUENCY-MODULATED SIGNAL DETECTION

(75) Inventors: Bernard Opitz, Leonberg (DE); Ulrich Wagner, Stuttgart (DE); Axel Franke, Ditzingen (DE); Carsten Raudzis, Frickenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/990,573

(22) PCT Filed: Jun. 13, 2006

(86) PCT No.: PCT/EP2006/063120

§ 371 (c)(1),
(2), (4) Date: Mar. 10, 2009

(87) PCT Pub. No.: WO2007/020115

PCT Pub. Date: Feb. 22, 2007

(65) Prior Publication Data

US 2009/0314079 A1    Dec. 24, 2009

(30) Foreign Application Priority Data

Aug. 16, 2005 (DE) .................. 10 2005 038 597

(51) Int. Cl.
*G01F 1/68* (2006.01)
(52) U.S. Cl. .................................. 73/204.26
(58) Field of Classification Search ............... 73/204.26, 73/204.17, 204.16, 204.15, 118.1
See application file for complete search history.

(56) References Cited

U.S. PATENT DOCUMENTS

| | | | | |
|---|---|---|---|---|
| 5,117,691 A | * | 6/1992 | Fraser | 73/204.15 |
| 5,184,509 A | * | 2/1993 | Kienzle et al. | 73/204.14 |
| 5,193,388 A | * | 3/1993 | Kleinhans | 73/204.14 |
| 6,223,593 B1 | * | 5/2001 | Kubisiak et al. | 73/204.15 |
| 2005/0044950 A1 | | 3/2005 | Kwon et al. | |

FOREIGN PATENT DOCUMENTS

| | | |
|---|---|---|
| EP | 1363130 A2 | 11/2003 |
| GB | 2241334 A | 8/1991 |

OTHER PUBLICATIONS

Levich, Veniamin G., "Physicochemical Hydrodynamics," Prentice-Hall, Inc., Englewood, NJ 1962, pp. 373-380.

* cited by examiner

*Primary Examiner*—Jewel Thompson
(74) *Attorney, Agent, or Firm*—Kenyon & Kenyon LLP

(57) ABSTRACT

A method for measuring an air mass flow flowing in a main flow direction, and a hot-film air mass meter by which the method is able to be realized. The method and the hot-film air mass meter are especially suitable for use in the induction tract of an internal combustion engine. The hot-film air mass meter includes a sensor chip having a chip surface across which an air mass flow is able to flow. The chip surface in turn has a measuring surface, the measuring surface including a central hot-film air mass meter circuit having at least one central heating element and at least two temperature sensors. The method is implemented so that the at least one central heating element is periodically heated using a frequency $\omega$. With the aid of at least two temperature sensors, at least two measuring signals are detected. The measuring signals and/or at least one differential signal of the at least two measuring signals are modulated using the frequency $\omega$.

16 Claims, 2 Drawing Sheets

HOT-FILM AIR MASS METER HAVING FREQUENCY-MODULATED SIGNAL DETECTION

FIELD OF THE INVENTION

The present invention relates to a hot-film air mass meter for measuring an air-mass flow that flows in a main flow direction, using frequency-modulated signal detection, and to a method for operating such a hot-film air mass meter. Hot-film air mass meters of this type are used in the induction tract of an internal combustion engine, in particular.

BACKGROUND INFORMATION

In many processes, for instance in the field of industrial process engineering, chemistry or machine construction, a gas mass, especially an air mass, has to be supplied in a specific manner. Among these are, in particular, combustion processes, which run under regulated conditions. An important example in this context is the combustion of fuel in internal combustion engines of motor vehicles, especially those having subsequent catalytic exhaust purification. Various types of sensors are used to measure the air-mass throughput.

One sensor type from the related art is what is generally referred to as a hot-film air mass sensor (HFM), which is discussed in one specific embodiment in DE 196 01 791 A1, for example. A sensor chip, which has a thin sensor diaphragm, e.g., a silicon sensor chip, is generally utilized in such hot-film air mass meters. At least one thermal resistor, which is surrounded by two or more temperature measuring resistors (temperature sensors), is typically situated on the sensor diaphragm. An air flow that is routed across the diaphragm causes a change in the temperature distribution pattern, which in turn is detectable by the temperature measuring resistors and is able to be analyzed with the aid of a control and evaluation circuit. For instance, an air mass flow is able to be determined from a difference in resistance of the temperature measuring resistors. Several other variations of this sensor type are known from the related art.

One problem with such a type of sensor known from DE 101 11 840 C2, for instance, is that contamination of the sensor type can often occur, such as contamination by oil, other fluids, or other types of soiling. As a rule, the sensor chip is used directly in the induction tract of the internal combustion engine or in a bypass to the induction tract of the internal combustion engine. During operation of the internal combustion engine oil may deposit on the sensor chip and on the sensor diaphragm, in particular. This oil deposit can lead to an undesired effect on the measuring signal of the sensor chip, especially since an oil film on the surface of the sensor chip affects the thermal conductivity of the surface, which results in a falsification of the measuring signals. Furthermore, the oil contamination can also occur during or shortly after deactivation of the internal combustion engine, e.g., a diesel engine.

This is the case especially when, following the deactivation of the internal combustion engine, an overpressure present in a crankcase is reduced via a crankcase ventilation into the induction tract of the internal combustion engine (and thus, e.g., also into the bypass canal of the hot-film air mass meter). Oil vapor or oil mist is often carried along in the process. Therefore, DE 101 11 840 C2 proposes a method for avoiding contamination on a sensor chip with the aid of a supplementary heater. The sensor chip has a sensor region and also a supplementary heater disposed outside the sensor region. This supplementary heater is heated electrically, in such a way that thermo-gradient turbulence occurs in the region of the supplementary heater, which results in deposits of the contamination of the flowing medium in the region of the supplementary heater, beyond the area of the sensor region.

In practice, however, the system disclosed in DE 101 11 840 C2 and the disclosed method have disadvantages in different operating modes of the internal combustion engine. For instance, one disadvantage is that a localization of the thermo-gradient turbulence as intended by the device disclosed in DE 101 11 840 C2 is virtually impossible in practice. Due to the high thermal conductivity of the silicon, the heat generated by the supplementary heater easily moves across the entire chip, which results in a "smeared" temperature distribution and thus to heating of the entire chip.

The problem of contamination of the diaphragm or the sensor surface is made worse by thermodynamic effects. It is known, for instance, that fluid droplets with a gradient in their surface tension are subjected to a force in the direction of the greater surface tension. This usually leads to a movement of the droplet from a lower to a higher surface tension. In particular, this gradient may be caused by a temperature gradient on a surface on which the fluid droplet is situated. The temperature gradient usually shifts from a warmer region of the surface to a colder region of the surface. This effect is discussed in, for instance, V. G. Levich, "Physicochemical Hydrodynamics", Prentice-Hall, N.J., 1962, p. 373 and p. 380.

As described above, typical hot-film air mass meters are configured such that they have a sensor diaphragm (e.g., a silicon diaphragm) having low thermal conductivity, and a surrounding chip mainland. During operation of the hot-film air mass meter, a temperature gradient and a corresponding fluid wall therefore normally build up at the edges of the sensor diaphragm, i.e., at the border to the surrounding chip mainland. This fluid wall may be fully or partially carried along by the air flow, so that oil droplets end up on the sensor diaphragm and may affect the measurement there. Furthermore, the fluid wall causes an increase in the thermal conductivity at the edge of the sensor diaphragm, which may lead to falsification and drift of the measuring signal.

SUMMARY OF THE INVENTION

Therefore, a hot-film air mass meter for measuring an air mass flow flowing in a main flow direction, in particular in the induction tract of an internal combustion engine, and a method for operating such a hot-film air mass meter are provided, which avoid the disadvantages of the devices and methods known from the related art.

The hot-film air mass meter has a sensor chip having a chip surface across which an air mass flow is able to flow. A "main flow direction" may be understood to denote, e.g., a main transportation direction of the air mass flow at the location of the hot-film air mass meter, e.g., at the location of a sensor chip. Local turbulence may be disregarded for the most part. The hot-film air mass meter is optimized especially for measuring an air mass flow having a flow velocity of between 0 and 60 m/s. As described above, the sensor chip may be, e.g., a silicon chip. The chip surface in turn has a measuring surface and a mainland surface. In this context, the subdivision of the chip surface should be implemented in such a way, in particular, that the sensor chip has a transversal conductivity in the region of the measuring surface that is less by at least one order of magnitude than in the region of the mainland surface. This reduction in the transversal conductivity may be achieved in different ways. As known from the related art and described earlier, it is possible to use sensor chips having a sensor diaphragm with a thickness of only a few μm, for instance. The low thermal conductivity (approx. 0.02 W/m K) of the air surrounding the sensor diaphragm is utilized in this context. As an alternative, a porous region or a plurality of porous regions in the sensor chip may be realized as measuring region having a measuring surface that faces the air mass flow, for instance by rendering a silicon chip porous. This enables the production of measuring regions which, due to the enclosed air cavities, have transversal conductivities of 0.1 to 2 W/m K, in comparison with a silicon substrate having a thermal conductivity of approximately 156 W/m K.

A central hot-film air mass meter circuit is affixed on the measuring surface of the hot-film air mass meter. "Affixed" means an affixation directly on the measuring surface or, as an alternative or in addition, also an affixation underneath the surface traversed by the air mass flow, the hot-film air mass meter circuit being completely or partially covered by an additional layer, for instance. The hot-film air mass meter circuit includes at least one central heating element and at least two temperature sensors. For example, the at least one central heating element and the at least two temperature sensors may be designed as conductor tracks or conductor track loops. Other developments are possible as well and known to one skilled in the art. The outer dimensions of the central hot-film air mass meter circuit may define, e.g., a sensor region on the measuring surface. The measuring surface is thus able to be subdivided into a sensor region and a region lying outside the sensor region.

According to the exemplary embodiments and/or exemplary methods of the present invention, the hot-film air mass meter is operated according to the method described below, the hot-film air mass meter including the further devices additionally required to execute the method of the present invention in one of its developments. The described method steps need not necessarily be implemented in the illustrated sequence. Furthermore, additional method steps, which are not shown, may be implemented as well. It is also possible to implement method steps repeatedly or parallel in time.

One basic idea of the exemplary embodiments and/or exemplary methods of the present invention is to spatially separate the afore-described thermal displacement effects of contamination as a result of (chronologically approximately constant) heating of the measuring surface from the actual measurement of the air mass flow. In the process, periodic heating with the aid of the central heating element is employed to measure the air mass flow; the local heating does not extend into the region of the contamination due to the thermal inertia of the measuring surface, but is essentially limited to a central region within the measuring surface. A frequency modulation method, e.g., a modified "lock-in method", is utilized to analyze the measurement, which additionally minimizes environmental influences on the signal acquisition such as, for example, the afore-described interference effects by contamination. Additional, chronologically constant heating of the measuring surface, which shifts contamination to the edge of the measuring surface, may be implemented for the actual shifting of contamination. Thus, a thermal "DC" component (approximately constant over time) may be utilized to displace the contaminations, and a thermal "AC" component may be utilized (periodically) to measure the air mass flow. That is to say, the basic idea of this modulation method is to implement the thermal stimulation by the at least one central heating element periodically and to consider only those components in the frequency spectrum that lie in the frequency range of the periodic stimulation in the subsequent measuring signal detection. In this way spurious signals such as noise or thermal drift are largely "blanked out". To this end, the at least one central heating element is periodically heated using a frequency $\omega$. This may be done, e.g., by equipping the at least one central heating element with at least one heating resistor, the periodic heating being implemented by applying to the at least one heating resistor a voltage having the frequency $\omega/2$. Since the heating output is proportional to the square of the voltage, this results in periodic heating at a frequency $\omega$.

To restrict the periodic heating by the central heating element to a surrounding region of the central heating element, it has shown to be advantageous to select the frequency of the heating in a range from 100 Hz to 100 kHz, and may especially be in a range between 100 Hz and 10 kHz. Given the typical materials used for sensor chips (e.g., silicon) and the typical dimensions of the measuring surface (e.g., a width of 300-800 μm, which may be approximately 450 μm perpendicular to the main flow direction with an approximately central placement of the central heating element), this selection of the frequency ensures that the temperature increase resulting from the periodic heating does not extend up to the edge region of the measuring surface. Thermal signals in this frequency range are unable to propagate, or propagate only poorly, in the chip materials in this frequency range, or they are heavily damped. Due to this damping, the spatial temperature characteristic of such periodic heating thus decreases, e.g., exponentially with the distance from the thermal exciter (i.e., the at least one central heating element). The exact progression of this reduction is heavily dependent upon the utilized chip configuration, which usually presents itself as a complex layer configuration.

The fact that the temperature increase caused by the periodic heating does not extend into the edge region of the measuring surface, or extends only to a negligible extent, has two decisive advantages: For one, the temperature profile of the periodic heating used for measuring the air mass flow does not superimpose itself, or superimposes itself only slightly, to air turbulence that arises in the edge region of the measuring surface and is due to contamination deposits that have collected there, which typically have an extension of approximately 100 μm parallel to the main flow direction (i.e., into the region of the measuring surface). For the most part, the actual measurement thus actually detects the main flow of the air mass flow, without any significant influence by turbulence attributable to contamination. For another, the temperature profile of the periodic heating used to measure the air mass flow is not, or only insignificantly, affected by changes in the thermal conductivity of the measuring surface in the edge region of the measuring surface, such changes likewise being caused by the contamination arising there. Both from the standpoint of flow mechanics and thermal aspects, the heating by the at least one central heating element is thus largely decoupled from the interference by contamination present in the edge region of the measuring surface.

This is in contrast to the methods and devices already known from the related art, where the measurement of the air mass flow generally takes place in the center of the measuring surface with uniform heating, e.g., at 0 Hz. Such low-frequency heating processes or heating processes that are constant over time cause the temperature profile to spread as far as the edge region of the measuring surface where it is affected by changes in the thermal conductivity and by flow turbulence. At 0 Hz, both effects integrally affect the entire measuring surface.

Two measuring signals are detected with the aid of the at least two temperature sensors. As described earlier, these at least two temperature sensors may be at least two temperature measuring resistors. At least one of these at least two temperature sensors may be situated upstream from the at least one central heating element relative to the main flow direction of the air mass flow, and at least one second of the at least two temperature sensors is connected downstream from the at least one central heating element relative to the main flow direction. The measuring signals are "raw signals", on which interference is usually superposed, e.g., interference caused by temperature drift or noise. Thus, a direct evaluation of these at least two measuring signals, e.g., by subtraction, normally includes errors.

In accordance with the exemplary embodiments and/or exemplary methods of the present invention, these at least two measuring signals are therefore demodulated using frequency $\omega$, i.e., the same frequency also used for the periodic heating of the at least one central heating element. As an alternative or in addition, instead of the at least two measuring signals, it is also possible to demodulate at least one differential signal of the at least two measuring signals. This means that the measuring signals are demodulated directly, or that, alternatively or additionally, first at least one difference is formed from these measuring signals, which then is demodulated. It should be pointed out here that "signals" need not necessarily mean the actual corresponding signals, but that, e.g., an amplification, a multiplication by a factor, a smoothing or similar operation may take place as well. Instead of using a differential signal, for instance, it is also possible to use or generate a signal that is proportional to the differential signal.

A "demodulation" is to be understood as a method in which only the signals within the frequency range of the "excitation", i.e., the periodic heating of the at least one central heating element in this case, are detected and evaluated. "Using frequency $\omega$" need not necessarily mean that a frequency "having a zero width" is used; instead, a frequency range having a finite width may be utilized, the width of the frequency range depending on the experimental configuration. Furthermore, apart from a demodulation using a frequency that exactly corresponds to the excitation frequency of the heating, it is also possible to employ an analog demodulation using higher harmonics. Experts are familiar with such methods from other technological fields, e.g., high frequency technology. The demodulation may be achieved, for instance, by mathematically multiplying the signal(s) to be demodulated by a periodic signal having a frequency that corresponds to a demodulation frequency. In practice, this "multiplication" is implemented using, e.g., one or several frequency mixers. Such a multiplication produces components that are constant over time, i.e., non-periodic, from the periodic measuring signal, as well as higher frequency components. On the other hand, non-periodic spurious signals or spurious signals in another frequency range are exclusively converted into high-frequency components but not into non-periodic components in this multiplication. The actual measuring signal is therefore able to be filtered out using a low-pass filter, while higher-frequency components are disregarded.

The demodulated measuring signals generated in this manner, and/or the at least one demodulated differential signal may then be used for the evaluation, i.e., to calculate an air mass flow, for instance. The described method and the device may additionally and advantageously be developed further according to the present invention. For example, at least one composite signal is able to be generated in addition, the at least one composite signal including at least one sum of the at least two demodulated measuring signals and/or at least one demodulated sum of the at least two measuring signals. That is to say, a sum operation may optionally be implemented first and followed by a demodulation, or a demodulation may be implemented first and followed by a sum operation. It is especially advantageous in this context if this at least one composite signal is used to regulate the at least one central heating element. The heating of the at least one central heating element may be regulated in such a way, for example, that the at least one composite signal remains essentially constant over time. This may be achieved by, e.g., controlling the amplitude of the heating by regulating the amplitude of a periodic heating voltage, for example. "Essentially constant over time" may mean, for instance, that a chronological deviation of no more than 10%, may be no more than 7%, and may especially be a system deviation of less than 1% is still tolerable.

The described demodulation method by itself already provides high insensitivity with regard to interference effects. A further development of the method, in which the previously described demodulation method is additionally supplemented by further regulation of the temperature of the measuring surface in the region of the central hot-film air mass meter circuit, has shown to be advantageous for increasing the utility of the afore-described method. For this purpose, the hot-film air mass meter may additionally include at least one temperature-adjustment element, which according to the exemplary embodiments and/or exemplary methods of the present invention is operated in such a way that the sensor chip in the region of the central hot-film air mass meter circuit is kept at a basic temperature profile that is essentially constant over time during operation of the hot-film air mass meter. As described above, this chronologically constant basic temperature profile forms the "DC" component of the thermal heating of the measuring surface, which ensures that contamination is shifted into the edge region of the measuring surface. In this case, as well, "essentially" means, for example, that essentially only low-frequency changes arise in the basic temperature profile. The deviations from this basic temperature profile should, for instance, amount to no more than 20%, and which may be no more than 10%, over the operating time of the hot-film air mass meter. This "basic temperature profile may be due exclusively to the at least one temperature-adjustment element; periodic temperature fluctuations caused by the at least one central heating element need not (should not) become part of the basic temperature profile, or should be incorporated only to a negligible degree.

For example, the additional at least one temperature-adjustment element may include a Peltier element or at least one additional thermal resistor. Using a corresponding control circuit, the at least one temperature-adjustment element is regulated so as to maintain the essentially constant basic temperature profile; as described above, periodic temperature fluctuations caused by the periodic heating of the at least one central heating element should in essence not be taken into account in the regulation of the basic temperature profile. This may be accomplished, for instance, by using one or several of the at least two measuring signals of the at least two temperature sensors and/or at least one additional measuring signal of at least one control temperature sensor to regulate the basic temperature profile, i.e., to regulate the at least one temperature-adjustment element. In order to "blank out" the effect of the periodic heating of the at least one central heating element, these measuring signals may be filtered, e.g., by a low pass, which has a limit frequency below the heating frequency of the at least one central heating element, and/or a limit frequency of one half of this heating frequency ($\omega/2$). With the aid of this at least one temperature-adjustment element, interference effects due to contamination, e.g., by an oil film deposit, in the region of the central hot-film air mass meter circuit are able to be reduced even further. In particular, it is possible to ensure that the "temperature foundation" (i.e., the basic temperature profile) is constant over time and exhibits few fluctuations in the frequency range of the afore-described demodulation method.

In principle, any local characteristic of the essentially constant basic temperature profile may be used. In order to simplify the afore-described generation of differential signals (i.e., to simplify, in particular, the electronic circuit required to generate the differential signals), the basic temperature profile may, for instance, have an essentially constant temperature characteristic in the region of the central hot-film air mass meter circuit. In this particular case, "essentially constant" means that the temperature characteristic between the at least two temperature sensors used for the demodulation method exhibits no change or only insignificant change, e.g., of no more than 20%. In this way, a "temperature plateau" is able to be adjusted between the at least two temperature sensors. Due to this "plateau", the measuring signals of these at least two temperature sensors have a mutual "offset", which disappears in a subtraction operation.

However, the disadvantage of a precisely level "plateau" is that contamination arising in the region of this plateau is no longer subjected to any thermo-gradient force and is therefore not shifted out of this region. It has therefore been shown to be advantageous if a slight temperature gradient (e.g., 10 K/100 µm) still remains in the region of this "plateau" as well, which shifts contamination into the edge region of the measuring surface. Stronger temperature gradients may then adjoin the plateau region in the edge region of the measuring surface so as to effectively keep contamination away from the plateau.

The basic temperature profile is advantageously adjusted in such a way that the temperature in the region of the basic temperature profile lies above the ambient temperature (edge regions outside the central hot-film air mass meter circuit may be disregarded). Given the afore-described chip dimensions with a typical width of the measuring region of approximately 450 µm, it has shown to be advantageous if the temperature in the region of the basic temperature profile (or in the region of the central hot-film air mass meter circuit) exceeds the ambient temperature by at least 40 K, which may be 80 K, and especially may be by at least 120 K. With typical widths of the edge region (edge regions are the regions where flow turbulence arises due to contamination, and where changes arise in the thermal conductivity due to contamination) of approximately 150 µm, this means average temperature gradients of at least approximately 0.2-0.3 K/µm, advantageously at least approximately 0.5 K/µm, and especially may be at least approximately 0.8 K/µm. The ambient temperature is to be understood as, for instance, a room temperature or an operating temperature, which may be subject to considerable fluctuations with respect to the room temperature, depending on where the hot-film air mass meter is used.

This selection of the basic temperature on the basis of an "over-temperature" relative to the ambient temperature has numerous advantages. For instance, it minimizes interference effects caused by fluctuations in the ambient temperature. A main advantage, however, consists of the "barrier effect" described previously already. A "temperature wall" is built around the central hot-film air mass meter circuit, which, due to the thermo-gradient effect, prevents contamination such as oil, in particular, from reaching the region of the hot-film air mass meter circuit. This design of the hot-film air mass meter and the described method thus effectively protects the central hot-film air mass meter circuit from interference effects.

In addition to the advantages already described, the described hot-film air mass meter and the described method in one of the described developments have numerous additional advantages in comparison with conventional devices and methods. In particular, no absolute values of the temperature profile but only relative changes within a separately controlled temperature plateau are detected. Contamination deposits outside this area therefore do not affect the measuring signal. Furthermore, by scaling the output signal to the sum of the input voltages (composite signal), the hot-film air mass meter is able to be designed to be immune to resistance drift of the circuit tracks. Another advantage is that the sensor chip of the hot-film air mass meter may have a relatively small and space-saving design. This makes it possible to considerably reduce the area minimally required for the measurement, i.e., the measuring surface or the sensor region, for instance, in comparison with the related art. This is especially due to the fact that, as described earlier, a "temperature wall" is able to be built around the measuring surface or around the sensor region due to the essentially constant basic temperature profile, so that even contamination located in close proximity to the circuit tracks of the central hot-film air mass meter circuit is effectively able to be kept away from the central hot-film air mass meter circuit.

The exemplary embodiments and/or exemplary methods of the present invention is explained in detail below on the basis of the drawings.

DETAILED DESCRIPTION

Figure 1:
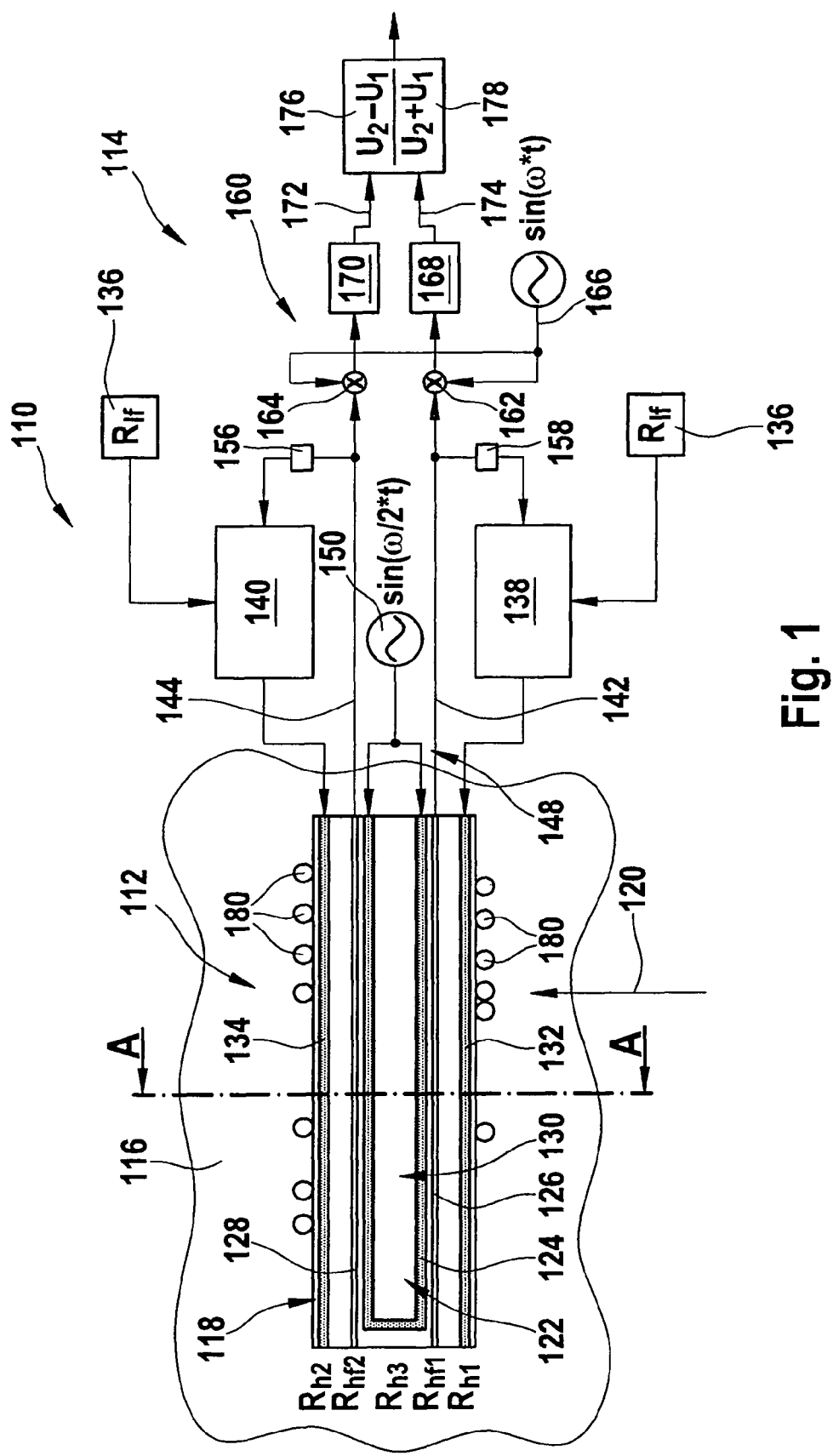
FIG. 1 shows a first exemplary embodiment of a hot-film air mass meter.

FIG. 1 schematically shows an exemplary embodiment of a hot-film air mass meter 110 according to the present invention. Hot-film air mass meter 110 has a sensor chip 112 (shown only in rudimentary form) and a control and evaluation circuit 114 (likewise shown only in rudimentary form). Sensor chip 112 may be used in the induction tract of an internal combustion engine, for instance, or in a bypass channel to the induction tract of an internal combustion engine. Such devices are known from DE 196 01 791 A1, for example. The sensor chip according to the development in FIG. 1 includes a chip mainland having a mainland surface 116 in the drawing plane (shown only in rudimentary form). In this exemplary embodiment it should be assumed that sensor chip 112 is a silicon sensor chip. In addition, sensor chip 112 includes a measuring region having a measuring surface 118 in the drawing plane. In this exemplary embodiment, measuring surface 118 is designed in the form of a rectangle whose longer sides are situated perpendicular to a main flow direction 120 of an air mass flow. In the region of measuring surface 118, sensor chip 112 has a thermal conductivity that amounts to 0.5 to 2 W/m K in comparison with the surrounding mainland with 156 W/m K.

Circuit tracks of a central hot-film air mass meter circuit 122 are disposed in the region of measuring surface 118. In this exemplary embodiment this central hot-film air mass meter circuit 122 is made up of a central heating element 124 and two temperature sensors 126, 128. Central heating element 124 is denoted by $R_{h3}$ and configured as circuit track loop in this exemplary embodiment. As an alternative, central heating element 124 may also be configured as line heating element. Temperature sensors 126, 128 are designed as line elements and denoted by $R_{hf1}$ and $R_{hf2}$, respectively. Temperature sensor 126 is situated "upstream" with respect to main flow direction 120 toward central heating element 124, temperature sensor 128 is situated "downstream". Temperature sensors 126, 128 are positioned in such a way that they are located in close proximity to a circuit track of central heating element 124. Central hot-film air mass meter circuit 122 covers a sensor region 130 of measuring surface 118. As can be seen, the sensor region upstream and downstream does not take up the entire measuring surface 118.

Two additional heating elements 132, 134 are situated outside sensor region 130, in parallel with the circuit tracks of central hot-film air mass meter circuit 122 and perpendicular to main flow direction 120. These additional heating elements 132, 134 constitute temperature adjustment elements with whose aid an essentially constant basic temperature profile is able to be adjusted in sensor region 130 of measuring surface 118. These additional heating elements 132, 134 are also denoted by, respectively, $R_{h1}$ and $R_{h2}$ in FIG. 1. Furthermore, an ambient temperature sensor 136, which is denoted by $R_{1f}$ in FIG. 1, is provided in hot-film air mass meter 110. This ambient temperature sensor 136 may be realized on sensor chip 112 or, alternatively or additionally, also as sensor in the region of control and evaluation circuit 114.

Figure 2A:
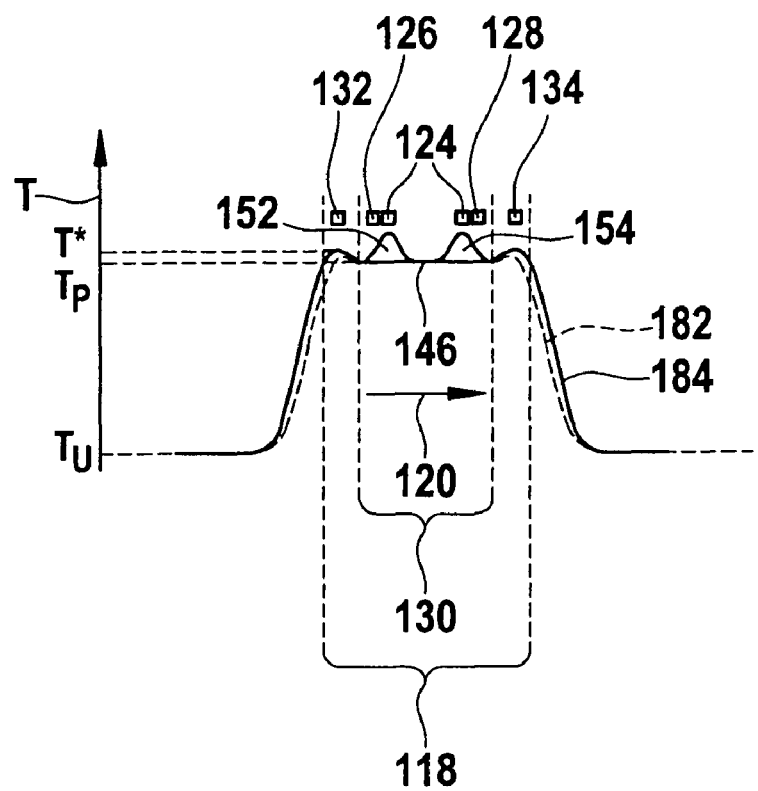
FIG. 2A shows a temperature characteristic along line A-A in FIG. 1 at a flow velocity of 0.
Figure 2B:
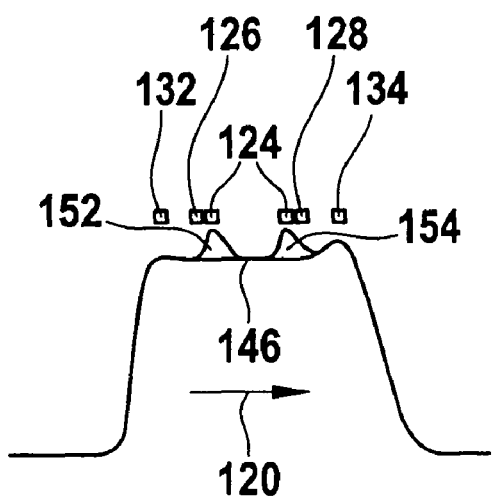
FIG. 2B shows the temperature characteristic according to FIG. 2A at a flow velocity of >0.

When hot-film air mass meter 110 is operated, additional heating elements 132, 134 are heated to an overtemperature T* relative to ambient temperature $T_U$, with the aid of control circuits 138, 140. Measuring signals 142, 144 of temperature sensors 126 and 128 are used as controlled variables for control circuits 138, 140. Control circuits 138, 140 may be PI controllers, for example, such as PI controllers having a band-stop filter. Additional electronic elements, such as current sources and/or amplifiers, may be provided as well. The effect of the temperature control according to FIG. 1 is illustrated in FIGS. 2A and 2B. FIGS. 2A and 2B show a temperature profile along cutting line A-A in FIG. 1. FIG. 2A shows the case in which the air mass across sensor chip 112 is at rest (air mass velocity 0, so that the term "main flow direction" must be interpreted symbolically in this case). In contrast, FIG. 2B shows the case of a flow velocity >0.

As can be gathered from the comparison of FIGS. 2A and 2B, heating temperatures T* at the location of additional heating elements 132, 134 coincide only in the case of an air mass flow having insignificant velocity. Given a finite flow velocity, on the other hand, additional heating elements 132, 134 are heated to different degrees in order to compensate for the removal by the air mass flow and to constantly keep the temperature to the value $T_P$ at the location of temperature sensors 126, 128. At an ambient temperature $T_U$ of approximately 20°, temperature $T_P$ is usually heated to a value of approximately 150° C. with the aid of additional heating elements 132, 134. A basic temperature profile 146, which progresses in a virtually flat, i.e., constant, manner in this simple exemplary embodiment, comes about between temperature sensors 126, 128. Thus, this basic temperature profile 146 has constant value $T_P$ within sensor region 130, which is roughly delimited by the outer edges of temperature sensors 126, 128. In practice, however, it is technically very difficult to generate an absolute flat basic temperature profile 146, and it is disadvantageous due to the then lacking temperature gradient in this region (see above). Accordingly, the region between temperature sensors 126, 128 may be designed to include a slight rise in temperature towards the center of measuring surface 128 so as to achieve a displacement effect here, as well.

An AC voltage $U_{ein}=A \cdot \sin(\omega/2)$ is then applied to central heating element 124. Since the heating output of central heating element 124 is proportional to the square of applied voltage $U_{ein}$, central heating element 124 is heated using a heating power that is proportional to $\sin(\omega t)$. This periodic heating using frequency $\sin(\omega t)$ is symbolically denoted by reference numeral 148 in FIG. 1. The circuit required to apply AC $U_{ein}$ is symbolically denoted by reference numeral 150 in FIG. 1. As indicated in FIG. 2A by reference numerals 152, 154, periodic heating 148 of central heating element 124 results in local temperature increases. These local temperature increases periodically "grow" out of basic temperature profile 146 at a frequency $\omega$ and exhibit their individual maximum at the location of the circuit tracks of central heating element 124. Temperature sensors 126, 128, which are disposed immediately adjacent to central heating element 124 on the outside, detect these local temperature increases 152 and 154. The amplitude and frequency of heating circuit 150 and the input voltage at which central heating element 124 is heated, are dimensioned such that local temperature increases 152, 154 change the temperature profile predominantly within the temperature plateau defined by additional heating elements 132, 134. Since measuring signals 142, 144 of temperature sensors 126, 128 are to be used simultaneously for measuring local temperature increases 152, 154 and for regulating the heating output of additional heating elements 132, 134 via control circuits 138, 140, measuring signals 142, 144 of temperature sensors 126, 128 may be filtered by low pass filters 156, 158 prior to being fed into control circuit 138, 140, additionally prior to being fed into control circuits 138, 140, in order to filter out the high-frequency (frequency $\omega$) components, which are attributable to local temperature increases 152, 154.

Changes in the local temperature increases 152, 154 due to the air mass flow are superposed by the periodic changes in local temperature increase 152, 154 (cf. FIGS. 2A and 2B) and may be utilized to determine the flow velocity of the air mass flow. This influence of the flow velocity on measuring signals 142, 144 is determined with the aid of a synchronous demodulator 160, which operates using a demodulation frequency $\omega$. Synchronous demodulator 160 is shown in considerably simplified form in FIG. 1. In a technical implementation, it may be designed in a complex-valued manner. Synchronous demodulator 160 has two frequency mixers 162, 164, in which each measuring signal 142, 144 of temperature sensors 126, 128 is mixed with a demodulation signal 166 having frequency $\omega$. High-frequency components are then filtered out in low pass filters 168, 170, so that demodulated measuring signals 172, 174 are generated from the original measuring signals 142, 144 of temperature sensors 126, 128. A differential signal (denoted by reference numeral 176 in FIG. 1) or a composite signal (reference numeral 178) may then be formed from these demodulated measuring signals 172, 174. In comparison with a specific embodiment in which differential or composite signals are formed first and then demodulated, this embodiment is preferred.

As illustrated in FIG. 2B in comparison with FIG. 2A, local temperature increases 152, 154 deform due to the air mass flow flowing across sensor chip 112 in main flow direction 120. Because of this, as can be gathered from FIG. 2B, a higher temperature is measured at the location of the downstream temperature sensor 128 than at the location of upstream temperature sensor 126. To this extent, differential signal 176 mirrors the flow velocity of the air mass flow, and this flow velocity is able to be calculated from this differential signal 176. Composite signal 178 may be utilized for scaling differential signal 176 by, for example, dividing differential signal 176 by composite signal 178. Possibly existing drift of the resistance values of resistors 126, 128 is able to be compensated in this manner. Furthermore, non-linear temperature influences may be restricted by a control loop (not shown in FIG. 1), which utilizes composite signal 178. By readjusting the amplitude of heating circuit 150 with the aid of composite signal 178 as input signal, it is therefore possible to readjust periodic heating 148 to the effect that composite signal 178 is kept constant.

In addition, FIGS. 1 and 2A symbolically illustrate the effect of contamination by oil droplets 180. Due to the aforedescribed temperature gradient effect, these oil droplets 180 collect mainly at the transition between mainland surface 116 and measuring surface 118. As shown in FIG. 2A, an especially pronounced temperature gradient prevails in this region, i.e., at the border of measuring surface 118. Oil droplets 180 cause an increase in the thermal conductivity of sensor chip 112 in this area. This "smears" the temperature characteristic, which is symbolically illustrated in FIG. 2A by the dashed temperature characteristic 182, in comparison with temperature characteristic 184 without contamination by oil droplets 180, which is indicated by a solid line. However, it is apparent that this influence of oil droplets 180 is eliminated by control circuits 138, 140, which stabilize the temperature in sensor region 130 according to the exemplary embodiments and/or exemplary methods of the present invention, as described previously. Therefore, oil droplets 180 have no thermal effect on measuring signals 142, 144 as long as the region of the temperature profile modulated using demodulation frequency ω (i.e., local temperature increases 152, 154) does not project beyond sensor region 130. As modulation frequency ω rises, the region in which local temperature increases 152, 154 manifest themselves becomes ever smaller due to the thermal inertia of measuring surface 118.

Since contamination in liquid form such as oil droplets 180 collects predominantly at the edge of measuring surface 118, hot-film air mass meter 110 according to the exemplary embodiments and/or exemplary methods of the present invention therefore has considerably greater robustness with respect to contamination. The shifting of the contamination away from measuring surface 118 requires a certain constant component of the temperature increase on measuring surface 118, which, as described above, is achieved by regulating additional heating elements 132, 134 to temperature $T_P$. In addition, a steady component of the power loss of central heating element 124 may also become apparent here. Within the scope of a design optimization, all resistors and circuit tracks 124, 126, 128, 132, 134 may be moved very close together, thereby further reducing the overall area of hot-film air mass meter 110 that is susceptible to contamination.

What is claimed is:

1. A method for measuring an air mass flow flowing in a main flow direction, the method comprising:
using a hot-film air mass meter, wherein the hot-film air mass meter includes a sensor chip having a chip surface across which an air mass is able to flow, the chip surface having a measuring surface, a central hot-film air mass meter circuit having at least one central heating element and at least two temperature sensors mounted on the measuring surface;
periodically heating the at least one central heating element using a frequency ω;
detecting at least two measuring signals of the at least two temperature sensors; and
demodulating at least one of the measuring signals and at least one differential signal of the at least two measuring signals using the frequency ω.

2. The method of claim 1, wherein the heating is implemented using a frequency in the range from 100 Hz to 100 kHz.

3. The method of claim 1, wherein at least one of the at least two measuring signals of at least one of (i) the at least two temperature sensors, and (ii) at least one additional measuring signal of at least one control temperature sensor is used to regulate the basic temperature profile.

4. The method of claim 3, wherein periodic temperature increases due to periodic heating of the at least one central heating element are essentially disregarded in regulating the basic temperature profile.

5. The method of claim 1, wherein an ambient temperature is recorded, and the basic temperature profile is selected such that the temperature, in at least one of a region of the basic temperature profile and in a region of the at least two temperature sensors, lies above the ambient temperature by at least 40 K.

6. The method of claim 1, wherein at least one composite signal is formed, and the at least one composite signal includes at least one of (i) at least one sum of the at least two demodulated measuring signals, and (ii) at least one demodulated sum of the at least two measuring signals.

7. The method of claim 6, wherein the heating of the at least one central heating element is regulated so that the at least one composite signal is essentially constant over time.

8. The method of claim 6, wherein the at least one composite signal is used to scale at least one of the measuring signals and the at least one demodulated differential signal.

9. A hot-film air mass meter for measuring an air mass flow flowing in a main flow direction, comprising:
a hot-film air mass meter, wherein the hot-film air mass meter includes a sensor chip having a chip surface across which an air mass is able to flow, the chip surface having a measuring surface;
a central hot-film air mass meter circuit having at least one central heating element and at least two temperature sensors mounted on the measuring surface;
an arrangement for performing the following:
periodically heating the at least one central heating element using a frequency ω;
detecting at least two measuring signals of the at least two temperature sensors; and
demodulating at least one of the measuring signals and at least one differential signal of the at least two measuring signals using the frequency ω.

10. The meter of claim 9, wherein the hot-film air mass meter is in an induction tract of an internal combustion engine.

11. The method of claim 1, wherein the heating is implemented using a frequency in the range from 1 kHz to 10 kHz.

12. The method of claim 3, wherein periodic temperature increases due to periodic heating of the at least one central heating element are essentially disregarded in regulating the basic temperature profile by using at least one blocking filter.

13. The method of claim 1, wherein an ambient temperature is recorded, and the basic temperature profile is selected such that the temperature, in at least one of a region of the basic temperature profile and in a region of the at least two temperature sensors, lies above the ambient temperature by at least 80 K.

14. The method of claim 1, wherein an ambient temperature is recorded, and the basic temperature profile is selected such that the temperature, in at least one of a region of the basic temperature profile and in a region of the at least two temperature sensors, lies above the ambient temperature by at least 120 K.

15. The method of claim 1, wherein the hot-film air mass meter is in an induction tract of an internal combustion engine.

16. The method of claim 1, wherein the hot-film air mass meter includes at least one temperature adjustment element, and wherein, in a region of the central hot-film air mass meter circuit, the at least one temperature adjustment element keeps the sensor chip at a basic temperature profile that is essentially constant over time during operation of the hot-film air mass meter.

* * * * *